(12) United States Patent
Ren et al.

(10) Patent No.: US 9,954,691 B2
(45) Date of Patent: Apr. 24, 2018

(54) METHOD AND APPARATUS FOR BINDING INTELLIGENT DEVICE

(71) Applicant: Xiaomi Inc., Beijing (CN)

(72) Inventors: Qiao Ren, Beijing (CN); Ming Zhao, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 128 days.

(21) Appl. No.: 14/955,972

(22) Filed: Dec. 1, 2015

(65) Prior Publication Data

US 2016/0191266 A1 Jun. 30, 2016

Related U.S. Application Data

(63) Continuation of application No. PCT/CN2015/080807, filed on Jun. 4, 2015.

(30) Foreign Application Priority Data

Dec. 29, 2014 (CN) .......................... 2014 1 0838494

(51) Int. Cl.
*H04L 12/28* (2006.01)
(52) U.S. Cl.
CPC ........ *H04L 12/2809* (2013.01); *H04L 12/281* (2013.01)
(58) Field of Classification Search
None
See application file for complete search history.

(56) References Cited

U.S. PATENT DOCUMENTS

| 8,854,669 B1 | 10/2014 | Jazayeri et al. |
| 2002/0152461 A1* | 10/2002 | Istvan ................. H04L 12/2803 725/32 |
| 2003/0041119 A1 | 2/2003 | Bisdikian et al. |
| 2006/0161445 A1 | 7/2006 | Frank |
| 2007/0143456 A1* | 6/2007 | Mashinsky ......... H04L 12/2803 709/223 |
| 2014/0173439 A1 | 6/2014 | Gutierrez et al. |
| 2014/0375428 A1 | 12/2014 | Park |

FOREIGN PATENT DOCUMENTS

| CN | 102238236 A | 11/2011 |
| CN | 102355390 A | 2/2012 |
| CN | 102684952 A | 9/2012 |
| CN | 102769619 A | 11/2012 |

(Continued)

OTHER PUBLICATIONS

Extended European Search Report dated May 24, 2016 for European Application No. 15201521.0, 8 pages.

(Continued)

*Primary Examiner* — Brian Roberts
(74) *Attorney, Agent, or Firm* — Arch & Lake LLP

(57) ABSTRACT

A method and an apparatus for binding an intelligent device are provided. In the method, the apparatus acquires an intelligent device list that includes binding states of intelligent devices with a current user account. The apparatus acquires an operation instruction for an intelligent device in the intelligent device list. The apparatus then update a binding state of the intelligent device with the current user account according to the operation instruction.

17 Claims, 11 Drawing Sheets

(56) References Cited

FOREIGN PATENT DOCUMENTS

| | | | |
|---|---|---|---|
| CN | 103019197 | A | 4/2013 |
| CN | 103399530 | A | 11/2013 |
| CN | 103607331 | A | 2/2014 |
| CN | 103616860 | A | 3/2014 |
| CN | 103747010 | A | 4/2014 |
| CN | 104122808 | A | 10/2014 |
| CN | 104468837 | A | 3/2015 |
| DE | 102013200374 | A1 | 7/2014 |
| JP | 2004021325 | A | 1/2004 |
| KR | 10-2011-0060955 | A | 6/2011 |
| RU | 119473 | U1 | 8/2012 |
| TW | 201448607 | A | 12/2014 |
| UA | 81054 | U | 6/2013 |
| WO | 2014049948 | A1 | 4/2014 |
| WO | WO 2014/160372 | A1 | 10/2014 |

OTHER PUBLICATIONS

International Search Report dated Aug. 26, 2015 for International Application No. PCT/CN2015/080807, 4 pages.

International Search Report (including English translation) issued in corresponding International Application No. PCT/CN2015/080807, dated Aug. 26, 2015, 4 pages.

Officicial Action (including English translation) issued in corresponding Russian Patent Application No. 2015133673/07(051793), dated Nov. 30, 2016, 11 pages.

Notice of Reasons for Refusal (including English translation) issued in corresponding Japanese Patent Application No. 2016-567119, dated Jan. 31, 2017, 8 pages.

First Office Action (including English translation) issued in corresponding Chinese Patent Application No. 201410838494.0, dated Apr. 26, 2017, 14 pages.

Grant of Patent (including English translation) issued in corresponding Korean Patent Application No. 10-2015-7020396, dated Apr. 27, 2017, 6 pages.

* cited by examiner

METHOD AND APPARATUS FOR BINDING INTELLIGENT DEVICE

CROSS-REFERENCE TO RELATED APPLICATIONS

The present application is a continuation of International Application No. PCT/CN2015/080807 with an international filing date of Jun. 4, 2015, which is based upon and claims priority to Chinese Patent Application No. 201410838494.0, filed Dec. 29, 2014, the entire contents of which are incorporated herein by reference.

TECHNICAL FIELD

The present disclosure generally relates to the field of communication technologies, and more particularly, to a method and an apparatus for binding an intelligent device.

BACKGROUND

With the improvement of internet technologies, intelligent devices have entered into a fast developing stage. An intelligent device may refer to various electronics which may access to the internet, for example, intelligent lights, intelligent sockets, intelligent webcams and the like. A user may control the intelligent devices by the internet, for example, a user may control on and off of intelligent devices, check information in intelligent devices, and the like. During the controlling process of intelligent devices, individual privacy and personal security of a user are usually involved. Thus, the security issues involved in intelligent device control become particularly important.

SUMMARY

The present disclosure provides methods and an apparatus for binding an intelligent device.

According to a first aspect of embodiments of the present disclosure, there is provided a method for binding an intelligent device. The method includes: acquiring an intelligent device list, the intelligent device list including binding states of intelligent devices with a current user account; acquiring an operation instruction for an intelligent device in the intelligent device list; and updating a binding state of the intelligent device with the current user account according to the operation instruction.

According to a second aspect of embodiments of the present disclosure, there is provided an apparatus for binding an intelligent device. The apparatus includes: a processor; and a memory for storing instructions executable by the processor. The processor is configured to perform: acquiring an intelligent device list, the intelligent device list including binding states of intelligent devices with a current user account; acquiring an operation instruction for an intelligent device in the intelligent device list; and updating a binding state of the intelligent device with the current user account according to the operation instruction.

According to a third aspect of embodiments of the present disclosure, there is provided a non-transitory storage medium including instructions, executable by a processor in an apparatus, for performing acts for binding an intelligent device. According to the acts, an apparatus acquires a first intelligent device list including intelligent devices bound to the current user account. The local gateway device acquires a second intelligent device list including intelligent devices operating in the same local area network with the apparatus. The apparatus inquires the server end for binding states of all the intelligent devices in the second intelligent device list. The apparatus generates a third intelligent device list according to intelligent devices which are not bound to a user account in the second intelligent device list. The apparatus combines the first intelligent device list and the third intelligent device list to obtain the acquired intelligent device list.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Figure 1:
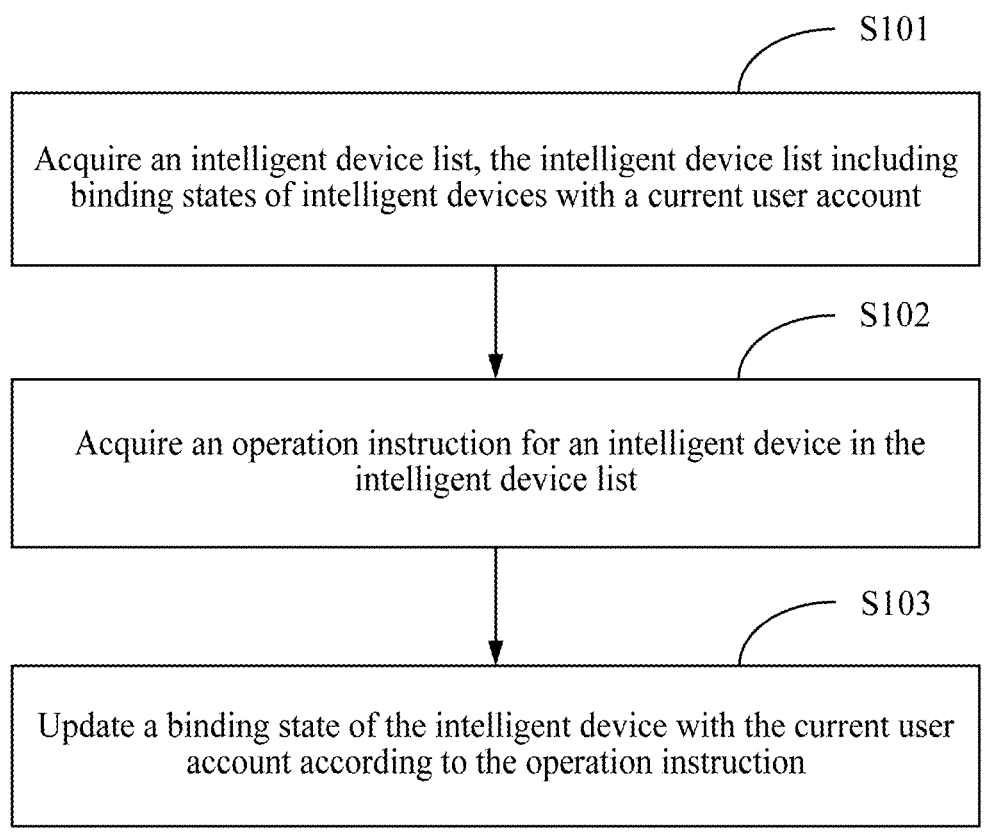
FIG. 1 is a flowchart showing a method for binding an intelligent device according to an exemplary embodiment.

FIG. 1 is a flowchart showing a method for binding an intelligent device according to an exemplary embodiment.

As shown in FIG. 1, the binding method may be implemented in an apparatus including a processor and a display. The apparatus may include a smart phone, a tablet, a terminal, or any other computing devices with communication functions. The binding method may include the following steps.

In step S101, an intelligent device list is acquired by the apparatus. The intelligent device list includes binding states of intelligent devices with a current user account.

For example, the terminal may acquire, from a server end, a first intelligent device list in which intelligent devices are bound to a current user account, and may acquire, from a local gateway device, a second intelligent device list in which intelligent devices are in the same local area network with the terminal, and combine the first intelligent device list and the intelligent devices which are not bound to a user count in the second intelligent device list to obtain the acquired intelligent device list. The server end may include a server application implemented by a remote server computer. Alternatively or additionally, the server end may be implemented at least partially by a dedicated hardware in the same local area network with the terminal.

In step S102, an operation instruction for an intelligent device in the intelligent device list is acquired by the apparatus.

For example, the terminal acquires a user operation instruction for an intelligent device in the intelligent device list. The operation instruction may include: a binding instruction for an intelligent device which is not bound to a user account and an unbinding instruction for an intelligent device which is bound to the current user account.

In step S103, the apparatus may update a binding state of the intelligent device with the current user account according to the operation instruction.

Based on the operation instruction acquired in step S102, the binding state of the intelligent device with the current user account is updated according to the operation instruction in this step. For example, an intelligent device selected by a user may be bound to the current user account according to a binding instruction, or the binding between an intelligent device selected by a user and the current user account may be released according to an unbinding instruction.

It can be seen from the above description that, the terminal in the present disclosure may acquire an intelligent device list, acquire, from a user, an operation instruction for an intelligent device in the intelligent device list, and update a binding state of the intelligent device with the current user account according to the operation instruction. Thus, binding and unbinding of intelligent devices with a user account may be realized and thereby security of intelligent device control may be guaranteed.

Figure 2:
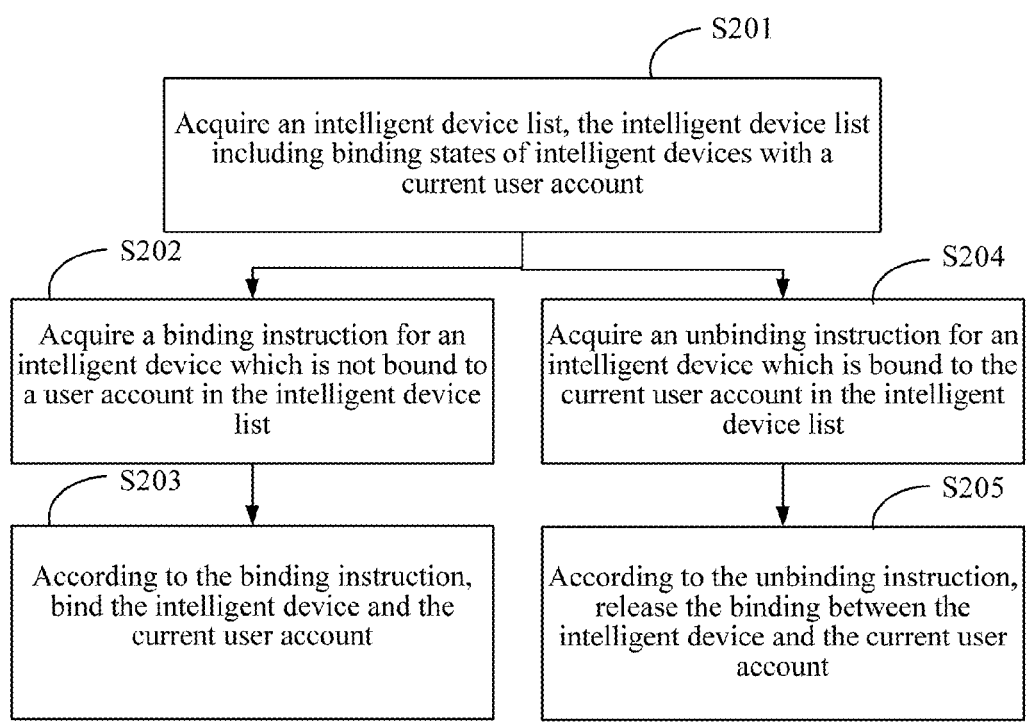
FIG. 2 is a flowchart showing another method for binding an intelligent device according to an exemplary embodiment.

FIG. 2 is a flowchart showing another method for binding an intelligent device according to an exemplary embodiment.

As shown in FIG. 2, the binding method may be implemented at least partially in a terminal, and the method may include the following steps.

In step S201, an intelligent device list is acquired. The intelligent device list includes binding states of intelligent devices with a current user account.

For example, a user may install application software (APP) for controlling intelligent devices in the terminal, and may log into the APP using the user's account name and password. When identity of the user is authenticated as valid by the account name and the password, this step S201 may be performed to acquire the intelligent device list. Rather, the user may log in by inputting the user's account name and password via a Web page, and the present disclosure does not impose limitations on this.

In the embodiments, a server end may save binding relationships between user accounts and intelligent devices. For example, the server end may save binding relationships between device IDs of intelligent devices and user accounts. The device IDs may be MAC (Media Access Control) addresses of intelligent devices, or may be unique IDs when the devices leave factories, as long as the device IDs may uniquely identify the intelligent devices, and the present disclosure does not impose specific limitations on this. If the device ID of an intelligent device is not bound to any user account, it is indicated that the intelligent device is not bound to any user account.

Figure 3:
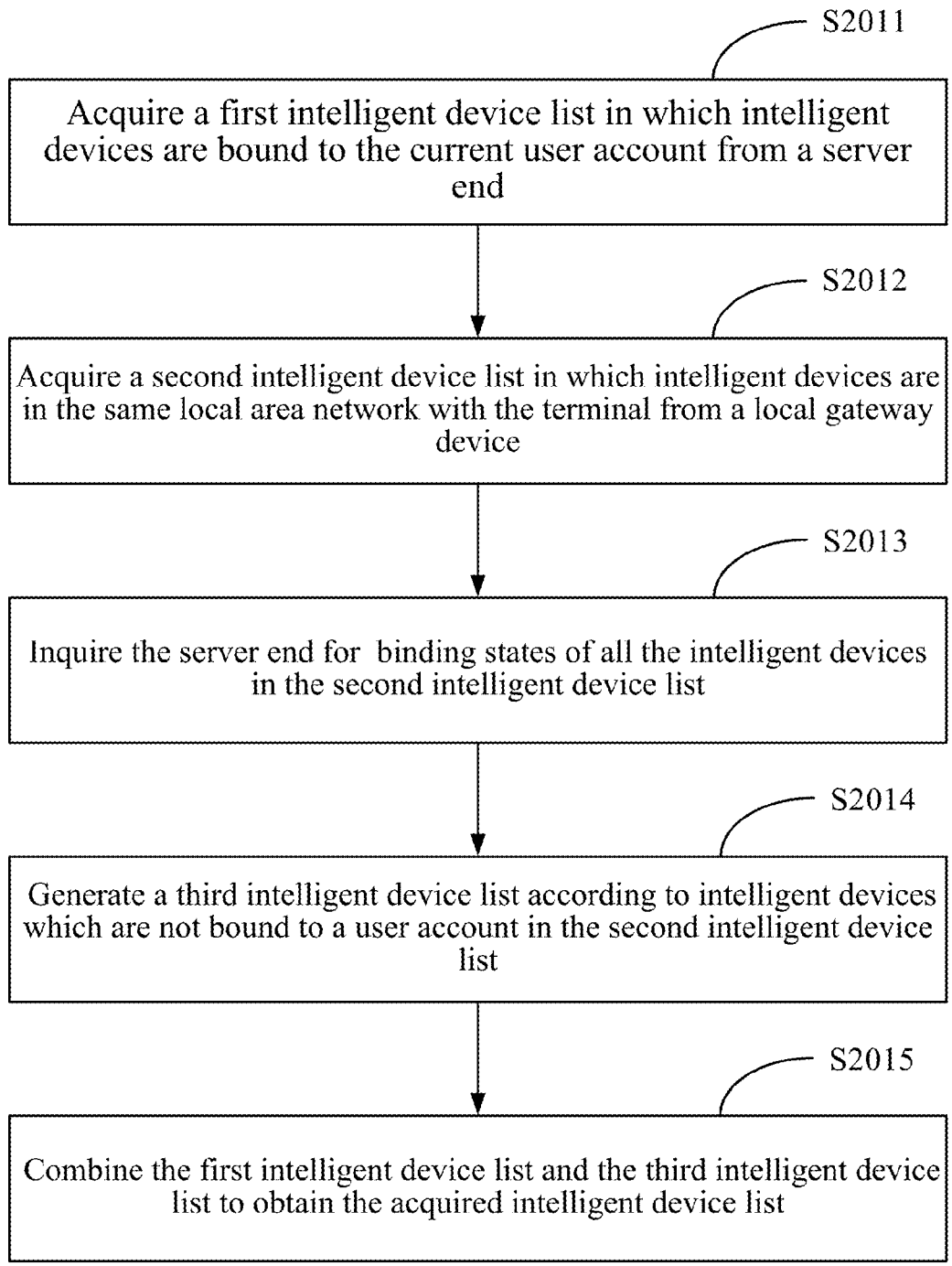
FIG. 3 is a flowchart showing a method for acquiring an intelligent device list according to an exemplary embodiment.

FIG. 3 is a flowchart showing a method for acquiring an intelligent device list according to an exemplary embodiment. The procedure for acquiring the intelligent device list may include the following steps.

In step S2011, a first intelligent device list in which intelligent devices are bound to a current user account is acquired from a server end.

In this step, after logging in by a user, a terminal may send a list acquiring request to the server end according to information of the user account. For example, the terminal may carry the account name of the user in the list acquiring request, and the server end returns a list of intelligent devices which are bound to the user account to the terminal according to the list acquiring request. In the present disclosure, for the convenience of distinguishing, the intelligent device list returned by the server end is called as a first intelligent device list.

In step S2012, a local gateway device acquires a second intelligent device list including intelligent devices operating in the same local area network with the terminal.

In the embodiments, the terminal sends a list acquiring request to a local gateway device, and the local gateway device returns to the terminal a list of intelligent devices which are connected to the gateway device according to the list acquiring request. In the present disclosure, for convenience of distinguishing, the intelligent device list returned by the local gateway device is called as a second intelligent device list. The intelligent devices in the second intelligent device list may include intelligent devices which have been bound to the current user account and may also include intelligent devices which have been bound to other user accounts, and may also include intelligent devices which are not bound to any user account.

In step S2013, the server end is inquired for binding states of all the intelligent devices in the second intelligent device list.

Based on the above step S2012, after receiving the second intelligent device list returned by the local gateway device, the terminal inquires the server end for the binding states of respective intelligent devices in the second intelligent device list. The terminal may send the device IDs of respective intelligent devices in the second intelligent device list to the server end, the server end performs inquiring according to the device IDs, and returns inquiry results to the terminal. For example, the server end may, based on agreements, send device IDs of intelligent devices which are bound to user accounts to the terminal as the inquiry result. Alternatively or additionally, the server end may send the device IDs of intelligent devices which are not bound to any user account to the terminal as the inquiry result. The present disclosure does not impose specific limitations on the server end.

In this step, the terminal inquires the server end for the binding states of all intelligent devices in the second intelligent device list, i.e., the terminal inquires whether the intelligent devices are bound to any user account, and the technical solution is not limited to only knowing whether the intelligent devices are bound to the current user account.

In step S2014, a third intelligent device list is generated according to intelligent devices which are not bound to a user account in the second intelligent device list.

Based on the above step S2013, after receiving the inquiry result returned by the server end, the terminal generates a third intelligent device list according to intelligent devices which are not bound to a user account in the second intelligent device list. If the server end returns, based on agreements, the device IDs of intelligent devices which are bound to user accounts as an inquiry result to the terminal, the terminal may delete the intelligent devices which are bound to user accounts returned by the server end from the second intelligent device list to generate the third intelligent device list in this step. If the server end returns the device IDs of intelligent devices which are not bound to any user account to the terminal as an inquiry result, the terminal may generate the third intelligent device list according to the device IDs returned by the server end in this step. The present disclosure does not impose specific limitations on this.

In step S2015, the first intelligent device list and the third intelligent device list are combined to obtain the acquired intelligent device list.

In this step, the terminal combines the first intelligent device list and the third intelligent device list, and takes the combined intelligent device list as the acquired intelligent device list. In the present disclosure, the combined intelligent device list may be called as a fourth intelligent device list. In this step, the terminal takes the fourth intelligent device list as the acquired intelligent device list by the terminal and presents the fourth intelligent device list to the user. In actual implementations, after successful logging in by the user using the account name and the password, the intelligent device list acquired by the terminal may be displayed on the screen of the terminal. The intelligent device list includes binding states of intelligent devices with the current user account. When a binding state is a bound state, i.e., an intelligent device has already been bound to a current user account, a current working state of the intelligent device may be presented in the intelligent device list, for example, whether an intelligent camera is started, or whether an automatic alarm is started, and so on. When the binding state is an unbound state, i.e., an intelligent device is not bound to a current user account, a mark indicating the unbound state may be presented in the intelligent device list, and a more personalized solution is providing a "binding" button for the intelligent device so that a user may bind the intelligent device by a one-key operation.

Figure 4:
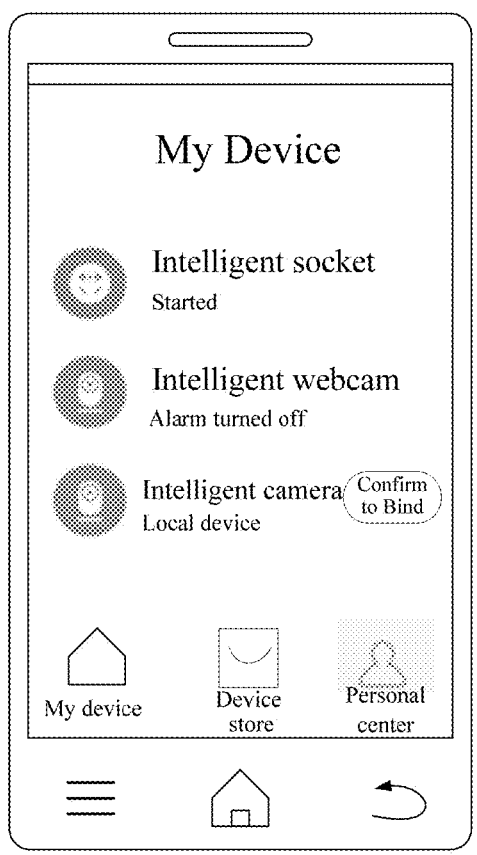
FIG. 4 is a schematic diagram showing an intelligent device list according to an exemplary embodiment.

FIG. 4 is a schematic diagram showing an intelligent device list according to an exemplary embodiment. In FIG. 4, a terminal acquires an intelligent device list including three intelligent devices, i.e., an intelligent socket, an intelligent webcam and an intelligent camera. The intelligent socket and the intelligent webcam have already been bound to a current user account because current working states of the intelligent socket and the intelligent webcam are respectively displayed: started and alarm turned off. The intelligent camera is not bound to any user account, and a button, "Confirm to Bind," is displayed for the intelligent camera to prompt the user that the intelligent camera has not been bound yet, and the user may perform binding of the intelligent camera by the "Confirm to Bind" button.

The present disclosure does not impose limitations on the performing sequence of the above steps S2011 and S2012. In another preferable embodiment of the present disclosure, steps S2012 and S2014 may be performed firstly and then step S2011 may be performed.

In the above embodiments, the apparatus acquires both the first intelligent device list in which intelligent devices are bound to the current user account from the server end and the second intelligent device list in which intelligent devices are in the same local area network with the apparatus from the local gateway device. The apparatus generates the third intelligent device list according to the intelligent devices which are not bound to a user account in the second intelligent device list. Then the apparatus combines the first intelligent device list and the third intelligent device list to obtain the acquired intelligent device list. Thus, a user may conveniently perform binding and unbinding operations on intelligent devices in the intelligent device list based on the user's actual demands without manual searching or inputting of intelligent devices. As a result, better user experiences may be arrived at.

Optionally, the apparatus may acquire an intelligent device list from a server end. For example, a local gateway device may send a local intelligent device list to a server end, and the server end screens intelligent devices which are not bound to any user account from the intelligent device list sent from the local gateway device. After logging in by a user, the terminal may send a list acquiring request to the server end, and the server end, according to the list acquiring request, combines the list of intelligent devices which are bound to user accounts and the list of intelligent devices which are screened from the intelligent device list sent from the local gateway device and are not bound to any user account and then return the combined intelligent device list to the terminal.

Optionally, the apparatus may acquire an intelligent device list from a local gateway device. For example, after logging in by a user through a terminal, the local gateway device may acquire, according to the logging information of the user, an intelligent device list in which intelligent devices are bound to user accounts from a server end, and may send a list of local intelligent devices to the server end to make the server end screen intelligent devices which are not bound to any user account. The local gateway device may combine the list of intelligent devices which are bound to user accounts and the list of intelligent devices which are not bound to any user account returned by the server end and returns the combined list to the terminal.

In step S202, a binding instruction for an intelligent device which is not bound to a user account in the intelligent device list is acquired.

Based on the above step S201, if a user wants to update a binding relationship of an intelligent device in the intelligent device list, the user may select the intelligent device in the intelligent device list and input related instructions to perform such binding.

If a user wants to bind an intelligent device which is not bound to the current user account in an intelligent device list, the user may input a binding instruction for the intelligent device. Further referring to FIG. 4, in this step, if a user wants to bind the intelligent camera in the intelligent device list, the user may tap the "Confirm to Bind" button next to the intelligent camera. Rather, in actual implementations, other manners may be employed to realize inputting of binding instructions, for example, voice input, and the like. The present disclosure does not impose specific limitations on this.

In step S203, according to the binding instruction, the intelligent device is bound to the current user account.

Based on the above step S202, after acquiring of the binding instruction for the intelligent device, the terminal binds the intelligent device to the current user account. In actual implementations, the terminal may send a binding request carrying information of the intelligent device and information of the current user account to the server end. For example, the terminal carries the device ID of the intelligent device and the account name of the current user account in the binding request, the server end saves the binding relationship between the device ID of the intelligent device and the account name of the current user account after receiving the binding request, and returns to the terminal information indicating successful binding. The terminal may prompt the successful binding to the user after receiving the information indicating successful binding, and update the binding state of the intelligent device in the intelligent device list.

In step S204, an unbinding instruction for an intelligent device which is bound to the current user account in the intelligent device list is acquired.

In the embodiments, based on the above step S201, if the user wants to unbind an intelligent device which has been bound to the current user account, the user may input an unbinding instruction for the intelligent device. Further referring to FIG. 4, in this step, if the user wants to unbind the intelligent socket, the user may tap the intelligent socket and enter into a management interface of the intelligent socket, and select a "Release Binding" button in the management interface. Rather, in actual implementations, a button, "Release Binding", may be provided for an intelligent device which is bound to the current user account in the intelligent device list, or an unbinding manner by voice may be employed. The present disclosure does not impose specific limitations on this.

In step S205, according to the unbinding instruction, binding between the intelligent device and the current user account is released.

Based on the above step S204, after acquiring of the unbinding instruction for the intelligent device, the terminal releases the binding between the intelligent device and the current user account. In actual implementations, the terminal may send an unbinding request carrying information of the intelligent device and information of the current user account to the server end. For example, the terminal may carry the device ID of the intelligent device and the account name of the current user account in the unbinding request, and the server end deletes the saved binding relationship between the device ID of the intelligent device and the account name of the current user account after receiving the unbinding request, and returns information indicating successful unbinding to the terminal. The terminal may prompt the user the successful unbinding after receiving the information indicating the successful unbinding, and update the binding state of the intelligent device in the intelligent device list. For example, a button, "Confirm to Bind", is again provided for the intelligent device.

Optionally, after building connection with the local gateway device, the apparatus may realize binding of the intelligent devices by the local gateway device. For example, after acquiring of the intelligent device list, the terminal may send a binding request to the local gateway device after acquiring, from a user, a binding instruction for an intelligent device which is not bound to any user account in the intelligent device list. If the local gateway device is not access to the internet, the local gateway device may send information indicating successful binding to the terminal, the terminal may perform controlling on the intelligent devices via the local area network composed of the local gateway device and local intelligent devices. After access to the internet, the local gateway device may send a binding request for binding the intelligent device and the user account to the server end to make the server end save the binding relationship between the intelligent device and the user account. In the embodiments, for unbinding procedure, the above-mentioned binding procedure may be referred to, and detailed descriptions are omitted here.

It can be seen from the above description that, the terminal in the present disclosure may acquire an intelligent device list, acquire an operation instruction for an intelligent device in the intelligent device list, and update a binding state of the intelligent device with the current user account according to the operation instruction. Thus, binding and unbinding of intelligent devices with a user account may be realized and thereby security of the intelligent device control may be guaranteed.

The implementation procedure of the present disclosure will be described hereinafter with specific examples.

Figure 5:
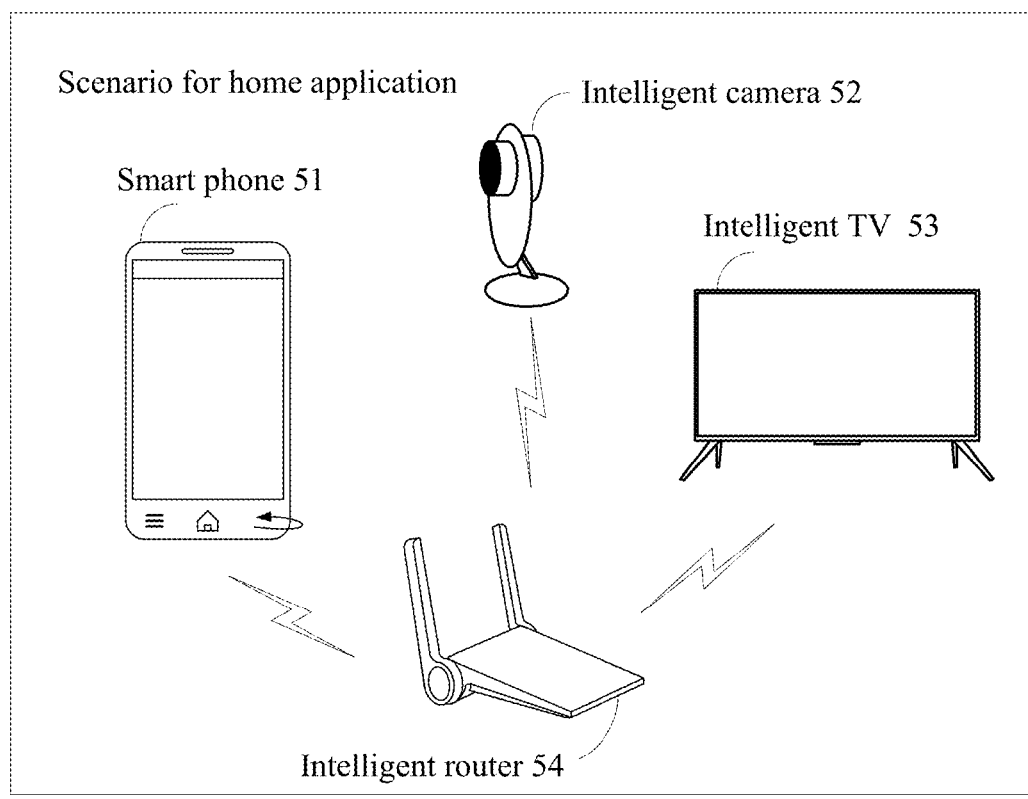
FIG. 5 is a schematic diagram showing a scenario of home application according to an exemplary embodiment.

Referring to the schematic diagram of a home application scenario as shown in FIG. 5, an intelligent camera 52 and an intelligent TV 53 in the home access to the internet via an intelligent router 54. It is assumed that the intelligent TV 53 has already been bound to a current user account A, and the intelligent camera 52 is not bound to any user account yet. When a user A uses installed APP for controlling intelligent devices in his/her smart phone 51 in the home, if logging in is successful, the smart phone 51 acquires an intelligent device list.

Figure 6:
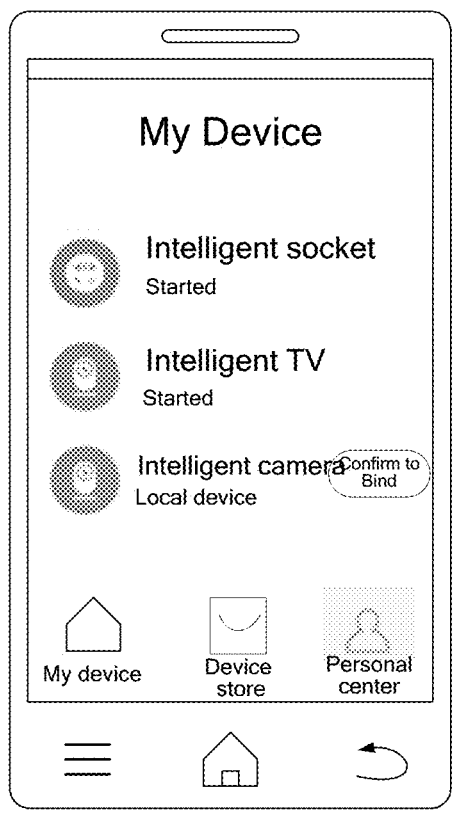
FIG. 6 is a schematic diagram showing a user interface according to an exemplary embodiment.

FIG. 6 shows a schematic diagram of an intelligent device list displayed after successful logging in by the user in this application scenario. An intelligent socket is located in an office of the user and has already been bound to the user account. Although the user is not at his/her office, the user may perform control on the intelligent socket by the intelligent device list. The intelligent TV 53 has already been bound to the user account A, the current working state of the intelligent TV 53 is displayed as: started. The intelligent camera 52 is not bound to any user account, a button "Confirm to Bind" is provided in this list.

Figure 7:
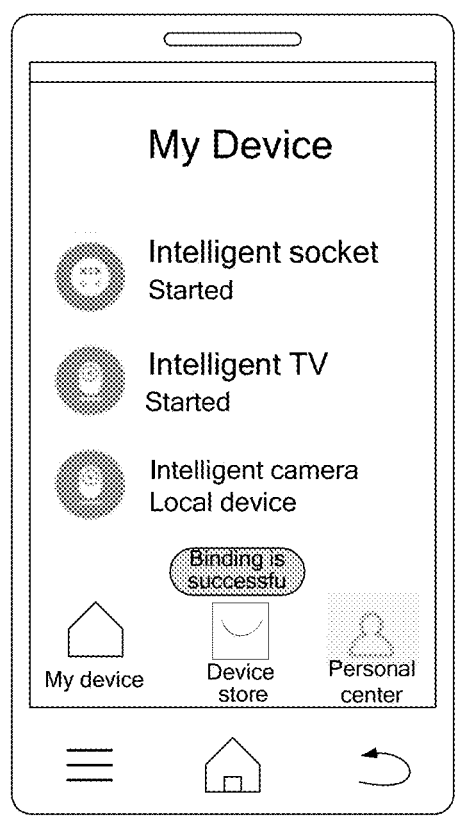
FIG. 7 is a schematic diagram showing another user interface according to an exemplary embodiment.
Figure 8:
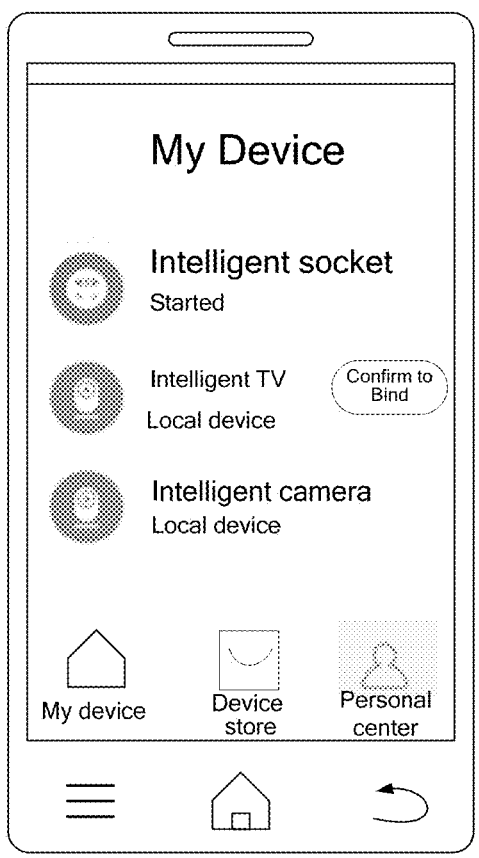
FIG. 8 is a schematic diagram showing another user interface according to an exemplary embodiment.

If the user wants to bind the intelligent camera 52 to the user account, the user may tap the button "Confirm to Bind," and the smart phone 51 may generate the schematic diagram of an intelligent device list as shown in FIG. 7 after successful binding between the intelligent camera 52 and the user account A. At this time, the user has valid control right on the intelligent camera 52 and may perform control on the intelligent camera 52 by the smart phone 51. If the user wants to unbind the intelligent TV 53 from the user account, the user may tap the intelligent TV in the list to enter into a management interface (not shown) of the intelligent TV 53, and select an unbinding button in the management interface (see FIG. 8). After successful unbinding, a schematic diagram of an intelligent device list as shown in FIG. 8 may be generated. At this time, the user does not possess control right on the intelligent TV53 and thus cannot control the intelligent TV 53.

In the above application scenario, the smart phone 51 may implement the above procedure using the embodiments of methods as shown in FIG. 1 or 2.

Corresponding to the above embodiments of the methods for binding an intelligent device, the present disclosure also provides embodiments of apparatus for binding an intelligent device.

Figure 9:
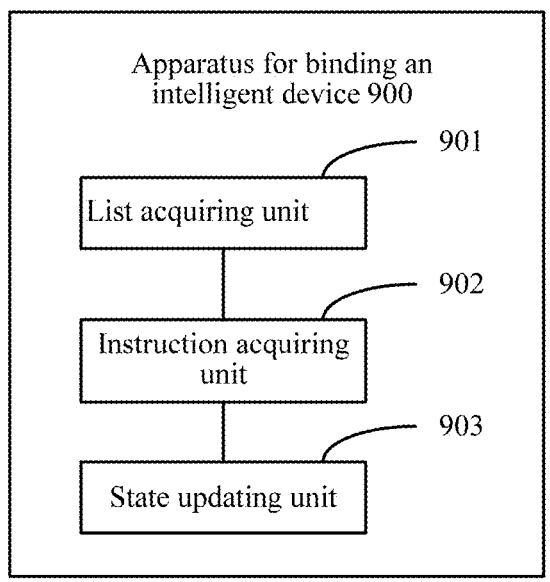
FIG. 9 is a block diagram showing an apparatus for binding an intelligent device according to an exemplary embodiment.

FIG. 9 is a block diagram showing an apparatus for binding an intelligent device according an exemplary embodiment.

Referring to FIG. 9, the apparatus 900 for binding an intelligent device may include a terminal including circuitries. The circuitries may include: a list acquiring unit 901, an instruction acquiring unit 902, and a state updating unit 903.

The list acquiring unit 901 is configured to acquire an intelligent device list, the intelligent device list including binding states of intelligent devices with a current user account.

The instruction acquiring unit 902 is configured to acquire an operation instruction for an intelligent device in the intelligent device list.

The state updating unit 903 is configured to update a binding state of the intelligent device with the current user account according to the operation instruction.

In the above embodiment, the terminal may acquire an intelligent device list, acquire, from a user, an operation instruction for an intelligent device in the intelligent device list, and update a binding state of the intelligent device with the current user account according to the operation instruction. Thus, binding and unbinding of intelligent devices with a user account may be realized and thereby security of the intelligent device control may be guaranteed.

Figure 10:
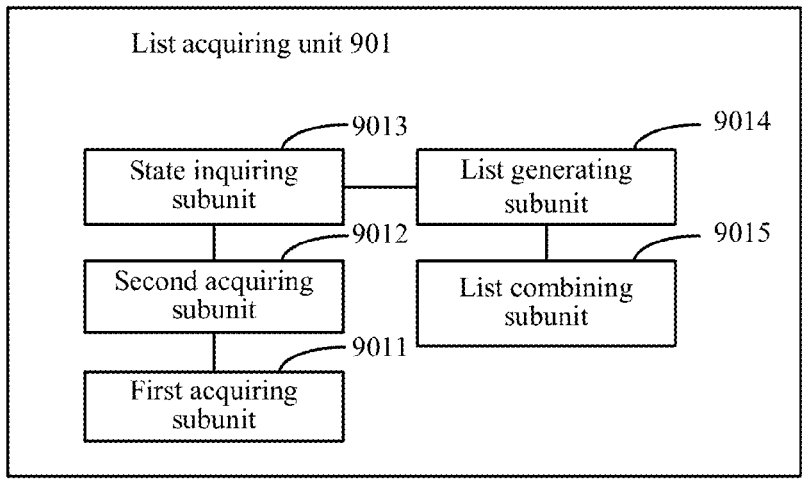
FIG. 10 is a block diagram showing another apparatus for binding an intelligent device according to an exemplary embodiment.

FIG. 10 is a block diagram showing another apparatus for binding an intelligent device according to an exemplary embodiment.

Referring to FIG. 10, based on the embodiment as shown in FIG. 9, the list acquiring unit 901 may include a first acquiring subunit 9011, a second acquiring subunit 9012, a state inquiring subunit 9013, a list generating subunit 9014 and a list combining subunit 9015.

The first acquiring subunit 9011 is configured to acquire, from a server end, a first intelligent device list in which intelligent devices are bound to the current user account.

The second acquiring subunit 9012 is configured to acquire, from a local gateway device, a second intelligent device list in which intelligent devices are in the same local area network with the terminal.

The state inquiring subunit 9013 is configured to inquire the server end for binding states of all the intelligent devices in the second intelligent device list.

The list generating subunit 9014 is configured to generate a third intelligent device list according to intelligent devices which are not bound to a user account in the second intelligent device list.

The list combining subunit 9015 is configured to combine the first intelligent device list and the third intelligent device list to obtain the acquired intelligent device list.

In the above embodiment, the terminal acquires both the first intelligent device list in which intelligent devices are bound to the current user account from the server end and the second intelligent device list in which intelligent devices are in the same local area network with the terminal from the local gateway device, and generates the third intelligent device list according to the intelligent devices which are not bound to a user account in the second intelligent device list, and then combines the first intelligent device list and the third intelligent device list to obtain the acquired intelligent device list. Thus, a user may conveniently perform binding and unbinding operations on intelligent devices in the intelligent device list based on the user's actual demands without manual searching or inputting of intelligent devices. As a result, better user experiences may be arrived at.

Figure 11:
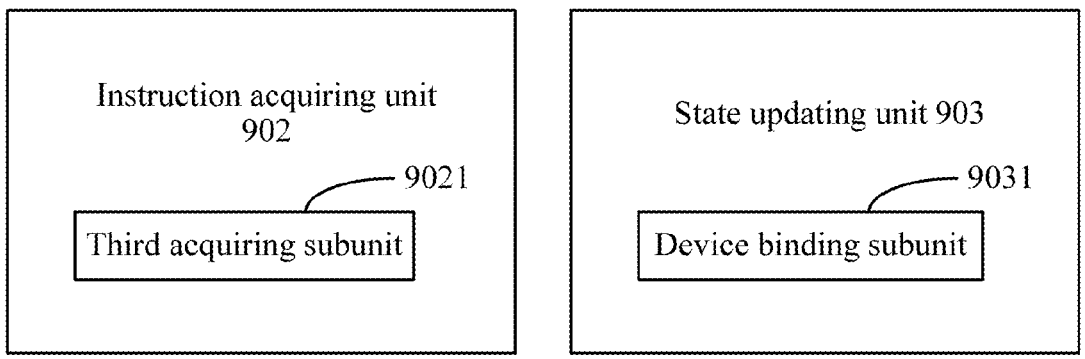
FIG. 11 is a block diagram showing another apparatus for binding an intelligent device according to an exemplary embodiment.

FIG. 11 is a block diagram showing another apparatus for binding an intelligent device according to an exemplary embodiment.

Referring to FIG. 11, based on the embodiment as shown in FIG. 10, the instruction acquiring unit 902 may include a third acquiring subunit 9021, and the state updating unit 903 may include a device binding subunit 9031.

The third acquiring subunit 9021 is configured to acquire a binding instruction for an intelligent device which is not bound to a user account in the intelligent device list.

The device binding subunit 9031 is configured to bind the intelligent device to the current user account according to the binding instruction.

Figure 12:
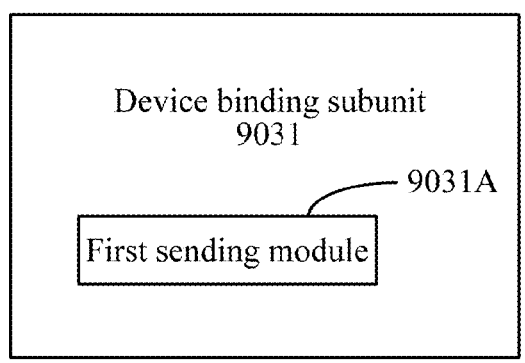
FIG. 12 is a block diagram showing another apparatus for binding an intelligent device according to an exemplary embodiment.

FIG. 12 is a block diagram showing another apparatus for binding an intelligent device according to an exemplary embodiment.

Referring to FIG. 12, based on the embodiment as shown in FIG. 11, the device binding subunit 9031 may include a first sending module 9031A.

The first sending module 9031A is configured to send a binding request carrying information of the intelligent device and information of the current user account to the server end to make the server end save a binding relationship between the intelligent device and the current user account according to the binding request.

Figure 13:
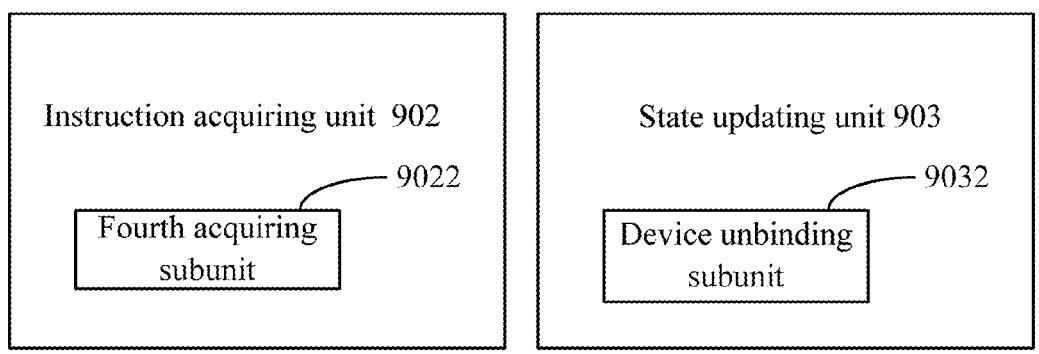
FIG. 13 is a block diagram showing another apparatus for binding an intelligent device according to an exemplary embodiment.

FIG. 13 is a block diagram showing another apparatus for binding an intelligent device according to an exemplary embodiment.

Referring to FIG. 13, based on the embodiment as shown in FIG. 10, the instruction acquiring unit 902 may include a fourth acquiring subunit 9022, and the state updating unit 903 may include a device unbinding subunit 9032.

The fourth acquiring subunit 9022 is configured to acquire an unbinding instruction for an intelligent device which is bound to the current user account in the intelligent device list.

The device unbinding subunit 9032 is configured to release the binding between the intelligent device and the current user account according to the unbinding instruction.

Figure 14:
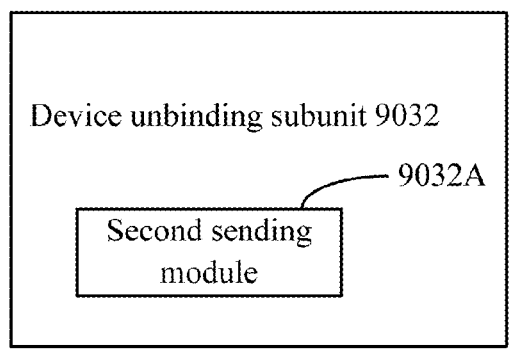
FIG. 14 is a block diagram showing another apparatus for binding an intelligent device according to an exemplary embodiment.

FIG. 14 is a block diagram showing another apparatus for binding an intelligent device according to an exemplary embodiment.

Referring to FIG. 14, based on the embodiment as shown in FIG. 13, the device unbinding subunit 9032 may include a second sending module 9032A.

The second sending module 9032A is configured to send an unbinding request carrying information of the intelligent device and information of the current user account to the server end to make the server end delete a saved binding relationship between the intelligent device and the current user account according to the unbinding request.

The roles and functions of respective units in the above apparatus may be realized as the procedure for realizing respective steps in the above methods, and detailed descriptions are omitted herein.

The apparatus may implement the above method embodiments. Thus, for related portions, the above descriptions of the method embodiments may be referred to. The above apparatus embodiments are only illustrative, and the units described as separate elements may be physically separated or not, and the portions presented as units may be physical units or not, they may be located at the same position or may be distributed over a plurality of network units. According to actual demands, a part or whole of the modules described herein may be selected to realize the objects of the present disclosure, and one of ordinary skill in this art may appreciate and practice this without creative work.

Accordingly, the present disclosure further provides an apparatus for binding an intelligent device, which may include: a processor; and a memory for storing instructions executable by the processor; wherein the processor is configured to perform: acquiring an intelligent device list, the intelligent device list including binding states of intelligent devices with a current user account; acquiring an operation instruction for an intelligent device in the intelligent device list; and updating a binding state of the intelligent device with the current user account according to the operation instruction.

Accordingly, the present disclosure also provides a non-transitory computer storage medium, when the instructions in the storage medium are executed by a processor of a terminal, the terminal is caused to perform a method for binding an intelligent device which includes: acquiring an intelligent device list, the intelligent device list including binding states of intelligent devices with a current user account; acquiring an operation instruction for an intelligent device in the intelligent device list; and updating a binding state of the intelligent device with the current user account according to the operation instruction.

Figure 15:
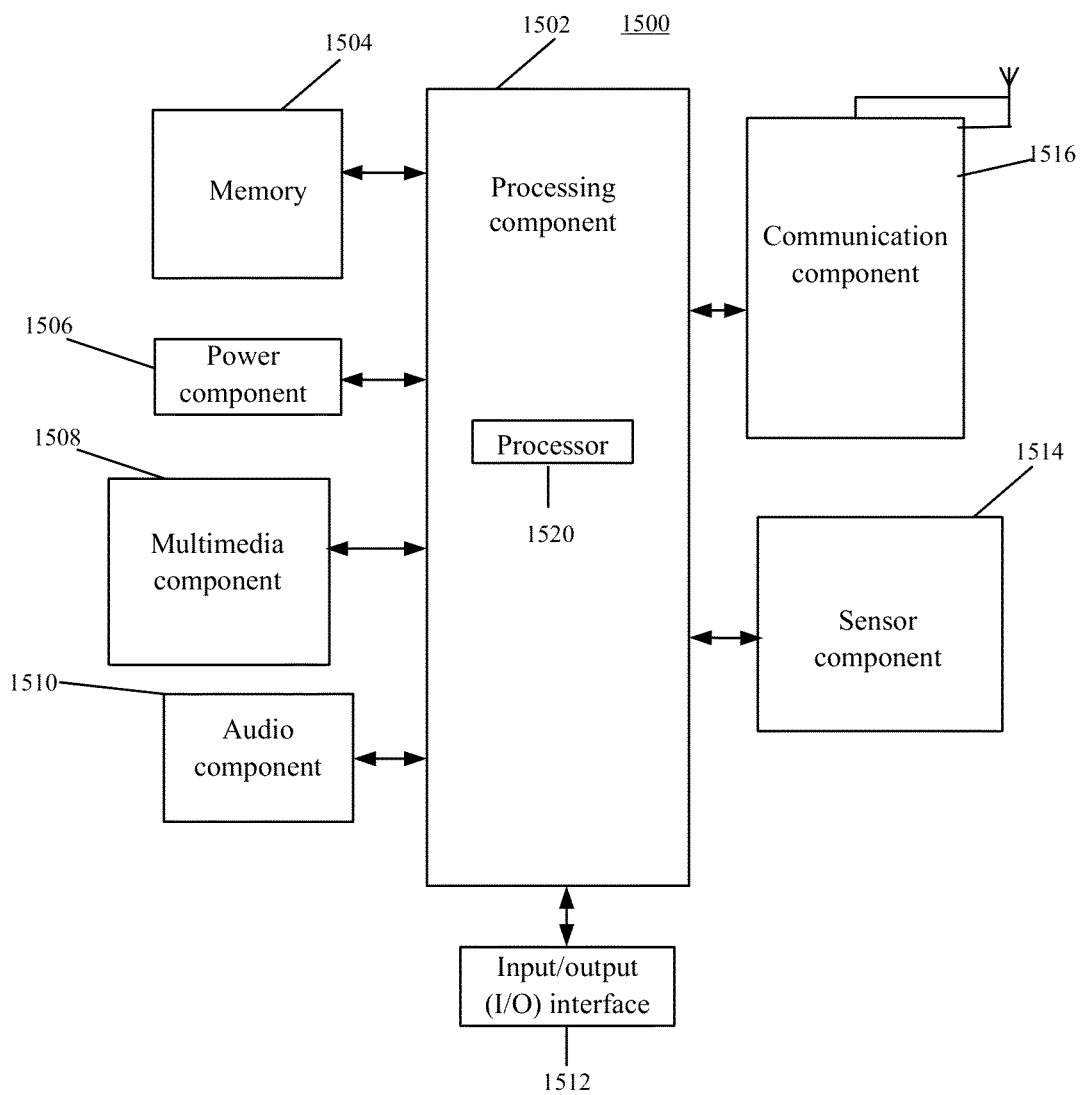
FIG. 15 is a structure block diagram showing a binding apparatus for an intelligent device according to an exemplary embodiment.

FIG. 15 is a block diagram showing a device 1500 for binding an intelligent device according to an exemplary embodiment. For example, the device 1500 may be a mobile phone, a computer, a digital broadcast terminal, a messaging device, a gaming console, a tablet, a medical device, exercise equipment, a personal digital assistant, and the like.

Referring to FIG. 15, the device 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the device 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the device 1500. Examples of such data include instructions for any applications or methods operated on the device 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the device 1500. The power component 1506 may include a power management system, one or more power sources, and any other components associated with the generation, management, and distribution of power in the device 1500.

The multimedia component 1508 includes a screen providing an output interface between the device 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. The front camera and the rear camera may receive an external multimedia datum while the device 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone ("MIC") configured to receive an external audio signal when the device 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the device 1500. For instance, the sensor component 1514 may detect an open/closed status of the device 1500, relative positioning of components, e.g., the display and the keypad, of the device 1500, a change in position of the device 1500 or a component of the device 1500, a presence or absence of user contact with the device 1500, an orientation or an acceleration/deceleration of the device 1500, and a change in temperature of the device 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component

1514 may also include an accelerometer sensor, a gyroscope sensor, a magnetic sensor, a pressure sensor, or a temperature sensor.

The communication component 1516 is configured to facilitate communication, wired or wirelessly, between the device 1500 and other devices. The device 1500 can access to a wireless network based on a communication standard, such as WiFi, 2G, or 3G, or a combination thereof. In one exemplary embodiment, the communication component 1516 receives a broadcast signal or broadcast associated information from an external broadcast management system via a broadcast channel. In one exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1500 may be implemented by circuitries including one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods. The units, subunit, modules, and sub-modules may be implemented by the one or more circuitries.

In exemplary embodiments, there is also provided a non-transitory computer-readable storage medium including instructions, such as included in the memory 1504, executable by the processor 1520 in the device 1500, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

The solutions provided by embodiments of the present disclosure may have the following advantageous effects.

The terminal in the present disclosure may acquire an intelligent device list, acquire, from a user, an operation instruction for an intelligent device in the intelligent device list, and update a binding state of the intelligent device with the current user account according to the operation instruction. Thus, binding and unbinding of intelligent devices with a user account may be realized and thereby security of the intelligent device control may be guaranteed.

The terminal in the present disclosure acquires both the first intelligent device list in which intelligent devices are bound to the current user account from the server end and the second intelligent device list in which intelligent devices are in the same local area network with the terminal from the local gateway device, and generates the third intelligent device list according to the intelligent devices which are not bound to a user account in the second intelligent device list, and then combines the first intelligent device list and the third intelligent device list to obtain the acquired intelligent device list. Thus, a user may conveniently perform binding and unbinding operations on intelligent devices in the intelligent device list based on the user's actual demands without manual searching or inputting of intelligent devices. As a result, better user experiences may be arrived at.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for binding an intelligent device to a user account, comprising:
   acquiring, by an apparatus comprising a processor and a screen, an intelligent device list comprising binding states of intelligent devices with a current user account;
   acquiring, by the apparatus, an operation instruction for an intelligent device in the intelligent device list; and
   updating, by the apparatus, a binding state of the intelligent device with the current user account according to the operation instruction,
   wherein acquiring the intelligent device list comprises:
   acquiring, from a server end, a first intelligent device list comprising at least one intelligent device bound to the current user account;
   acquiring, from a local gateway device, a second intelligent device list comprising devices operating in the same local area network with the apparatus; and
   inquiring, by the apparatus, the server end for binding states of all the intelligent devices in the second intelligent device list.

2. The method according to claim 1, wherein acquiring the intelligent device list further comprises:
   generating, by the apparatus, a third intelligent device list according to intelligent devices which are not bound to a user account in the second intelligent device list; and
   combining, by the apparatus, the first intelligent device list and the third intelligent device list to obtain the acquired intelligent device list.

3. The method according to claim 1, wherein acquiring the operation instruction for the intelligent device in the intelligent device list comprises: acquiring a binding instruction for an intelligent device that is not bound to a user account in the intelligent device list; and
   the updating a binding state of the intelligent device with the current user account according to the operation instruction, comprises: binding the intelligent device to the current user account according to the binding instruction.

4. The method according to claim 3, wherein binding the intelligent device to the current user account comprises:
   sending a binding request carrying information of the intelligent device and information of the current user account to a server end to make the server end save a binding relationship between the intelligent device and the current user account according to the binding request.

5. The method according to claim 1, wherein the acquiring an operation instruction for an intelligent device in the intelligent device list, comprises: acquiring an unbinding instruction for an intelligent device that is bound to the current user account in the intelligent device list; and
   the updating a binding state of the intelligent device with the current user account according to the operation instruction, comprises: releasing the binding between the intelligent device and the current user account according to the unbinding instruction.

6. The method according to claim 5, wherein releasing the binding between the intelligent device and the current user account comprises:
sending an unbinding request carrying information of the intelligent device and information of the current user account to a server end to make the server end delete a saved binding relationship between the intelligent device and the current user account according to the unbinding request.

7. An apparatus for binding an intelligent device, comprising:
a processor; and
a memory for storing instructions executable by the processor; wherein the processor is configured to perform:
acquiring an intelligent device list comprising binding states of intelligent devices with a current user account;
acquiring an operation instruction for an intelligent device in the intelligent device list; and
updating a binding state of the intelligent device with the current user account according to the operation instruction,
wherein the processor is further configured to perform:
acquiring, from a server end, a first intelligent device list comprising at least one intelligent device bound to the current user account;
acquiring, from a local gateway device, a second intelligent device list comprising intelligent devices operating in the same local area network with the apparatus; and
inquiring the server end for binding states of all the intelligent devices in the second intelligent device list.

8. The apparatus according to claim 7, wherein the processor is configured to perform: generating a third intelligent device list according to intelligent devices which are not
bound to a user account in the second intelligent device list; and
combining the first intelligent device list and the third intelligent device list to obtain the acquired intelligent device list.

9. The apparatus according to claim 7, wherein the processor is configured to perform: acquiring a binding instruction for an intelligent device that is not bound to a user
account in the intelligent device list; and
binding the intelligent device to the current user account according to the binding instruction.

10. The apparatus according to claim 9, wherein the processor is configured to perform: sending a binding request carrying information of the intelligent device and information
of the current user account to a server end to make the server end save a binding relationship between the intelligent device and the current user account according to the binding request.

11. The apparatus according to claim 7, wherein the processor is configured to perform:
acquiring an unbinding instruction for an intelligent device that is bound to the current user account in the intelligent device list; and releasing the binding between the intelligent device and the current user account according to the unbinding instruction.

12. The apparatus according to claim 11, wherein the processor is configured to perform:
sending an unbinding request carrying information of the intelligent device and information of the current user account to a server end to make the server end delete a saved binding relationship between the intelligent device and the current user account according to the unbinding request.

13. A non-transitory storage medium comprising instructions, executable by a processor in an apparatus, for performing acts comprising:
acquiring an intelligent device list, the intelligent device list comprising binding states of intelligent devices with a current user account;
acquiring an operation instruction for an intelligent device in the intelligent device list; and
updating a binding state of the intelligent device with the current user account according to the operation instruction,
wherein acquiring the intelligent device list comprises:
acquiring, by an apparatus from a server end, a first intelligent device list comprising intelligent devices bound to the current user account;
acquiring, from a local gateway device, a second intelligent device list comprising intelligent devices operating in the same local area network with the apparatus;
inquiring, by the apparatus, the server end for binding states of all the intelligent devices in the second intelligent device list;
generating, by the apparatus, a third intelligent device list according to intelligent devices which are not bound to a user account in the second intelligent device list and combining, by the apparatus, the first intelligent device list and the third intelligent device list to obtain the acquired intelligent device list.

14. The non-transitory storage medium according to claim 13, wherein acquiring the operation instruction for an intelligent device in the intelligent device list comprises:
acquiring a binding instruction for an intelligent device that is not bound to a user account in the intelligent device list; and
the updating a binding state of the intelligent device with the current user account according to the operation instruction, comprises: binding the intelligent device to the current user account according to the binding instruction.

15. The non-transitory storage medium according to claim 14, wherein binding the intelligent device to the current user account comprises:
sending a binding request carrying information of the intelligent device and information of the current user account to a server end to make the server end save a binding relationship between the intelligent device and the current user account according to the binding request.

16. The non-transitory storage medium according to claim 13, wherein acquiring the operation instruction for an intelligent device in the intelligent device list, comprises:
acquiring an unbinding instruction for an intelligent device that is bound to the current user account in the intelligent device list; and
the updating a binding state of the intelligent device with the current user account according to the operation instruction, comprises: releasing the binding between the intelligent device and the current user account according to the unbinding instruction.

17. The non-transitory storage medium according to claim 16, wherein releasing the binding between the intelligent device and the current user account comprises:
sending an unbinding request carrying information of the intelligent device and information of the current user account to a server end to make the server end delete a saved binding relationship between the intelligent device and the current user account according to the unbinding request.

* * * * *